(12) United States Patent
Brouard et al.

(10) Patent No.: US 9,413,990 B2
(45) Date of Patent: Aug. 9, 2016

(54) IMAGING METHOD

(75) Inventors: Laurent Brouard, Toulouse (FR);
Cyrille Tourneur, Toulouse (FR)

(73) Assignee: Airbus Defence and Space SAS, Les Mureaux (FR)

( * ) Notice: Subject to any disclaimer, the term of this patent is extended or adjusted under 35 U.S.C. 154(b) by 634 days.

(21) Appl. No.: 13/696,254

(22) PCT Filed: Apr. 28, 2011

(86) PCT No.: PCT/FR2011/050978
§ 371 (c)(1),
(2), (4) Date: Nov. 5, 2012

(87) PCT Pub. No.: WO2011/138542
PCT Pub. Date: Nov. 10, 2011

(65) Prior Publication Data
US 2013/0050494 A1 Feb. 28, 2013

(30) Foreign Application Priority Data

May 4, 2010 (FR) .................................... 10 53443

(51) Int. Cl.
*H04N 5/345* (2011.01)
*H04N 5/232* (2006.01)
*H04N 5/372* (2011.01)

(52) U.S. Cl.
CPC ......... *H04N 5/3456* (2013.01); *H04N 5/23296* (2013.01); *H04N 5/37206* (2013.01)

(58) Field of Classification Search
CPC ............ H04N 5/23296; H04N 5/3456; H04N 5/37206
See application file for complete search history.

(56) References Cited

U.S. PATENT DOCUMENTS

| | | | | |
|---|---|---|---|---|
| 4,541,010 | A  * |  9/1985 | Alston | 348/283 |
| 6,130,705 | A  * | 10/2000 | Lareau et al. | 348/144 |
| 2002/0158973 | A1 | 10/2002 | Gomi | |
| 2005/0151866 | A1* |  7/2005 | Ando et al. | 348/297 |
| 2006/0109352 | A1 |  5/2006 | Drajer | |

FOREIGN PATENT DOCUMENTS

EP 1282304 A1 2/2006

OTHER PUBLICATIONS

International Search Report and Written Opinion for PCT Application PCT/FR2011/050978, Aug. 8, 2011, 10 pgs.

* cited by examiner

*Primary Examiner* — Sath V Perungavoor
*Assistant Examiner* — Peter D Le
(74) *Attorney, Agent, or Firm* — Patterson Thuente Pedersen, P.A.

(57) ABSTRACT

The invention relates to an imaging method, including reconstructing a final image (IF) from intensity values inputted by a limited selection of photodetectors (2). One out of every two photodetectors is selected along columns ($C_{DET}$) and rows ($L_{DET}$). The final image has a resolution that is double that of a picture within the plane of the photodetectors. With identical resolution, the modulation transfer function is improved relative to an image that would be inputted while using all the photodetectors. Additionally, an image-sensing optical system that is used for an imaging method according to the invention can be of reduced size and weight, having constant resolution and constant modulation transfer functions.

13 Claims, 7 Drawing Sheets

IMAGING METHOD

PRIORITY CLAIM

The present application is a National Phase entry of PCT Application No. PCT/FR2011/050978, filed Apr. 28, 2011, which claims priority from French Application No. 1053443, filed May 4, 2010, the disclosures of which are hereby incorporated by reference herein in their entirety.

FIELD OF THE INVENTION

The invention relates to an imaging method which is intended to be used from an aircraft or spacecraft, as well as an imaging system for implementing such a method.

BACKGROUND OF THE INVENTION

When an array of photodetectors is used to capture intensity values of an image formed by an image-sensing optical system, the final image provided to the user is generally constructed by directly assigning the intensity values that were captured to the pixels of an image matrix which reproduces the photodetector array. All the photodetectors therefore have a one-to-one correspondence to pixels in the image matrix, and intensity values captured by two adjacent photodetectors are assigned to two pixels which are also adjacent in the matrix of the final image.

Other image capture modes also exist, and the intensity values that are captured are assigned to the pixels of the final image matrix in a manner adapted to each capture mode. In particular, when a scene is captured in push-broom mode, the final image is reconstructed by assigning, to the pixels of different segments of the final image matrix, intensity values which were captured at different times as the scene is scanned by the image capture system. Such a push-broom capture mode is used in a scanner or photocopier, for example. It is also known to use push-broom mode to photograph portions of the Earth's surface from a satellite. In this case, a portion of the Earth's surface is scanned as the pointing direction of the image-sensing optical system advances.

However, in such a push-broom capture mode, adjacent pixels of the final image reproduce unit regions of the photographed scene which are separated by the dimension of a photodetector, divided by the enlargement of the image-sensing optical system for the image capture conditions used. For the Earth imaging application, this distance separating two unit regions of the Earth's surface reproduced in neighboring pixels in the final image matrix is called ground sampling distance (GSD) or ground resolution.

Another characteristic of imaging methods is the modulation transfer function, commonly referred to as MTF. It is equal to the quotient of the contrast of a periodic modulation in the final image divided by the actual contrast of this modulation in the photographed scene. The value of the modulation transfer function decreases when the spatial frequency of the modulation increases. The value of the modulation transfer function is limited by several effects, including effects of the image-sensing optical system and of the photodetectors used. In particular, increasing the diameter of the entrance pupil of the image-sensing optical system increases the modulation transfer function. Conversely, non-zero individual dimensions of photodetectors and a possible crosstalk occurring between neighboring photodetectors contributes to reducing the modulation transfer function. Obtaining a modulation transfer function which has high values is desired, particularly for earth imaging applications.

SUMMARY OF THE INVENTION

One aim of the present invention therefore consists of increasing the modulation transfer function as impacted by the effects of photodetectors on the values of this function.

Another aim of the invention consists of reducing the dimensions of the image-sensing optical system while the resolution and modulation transfer function remain the same. Such a reduction in the dimensions of the image-sensing optical system is intended to reduce the cost of this system, its dimensions, and its weight. As a result, it also reduces the dimensions of an aircraft or spacecraft carrying this system on board, as well as the costs of launching such a spacecraft.

These aims of the invention also concern an image capture mode in which an array of photodetectors is used to capture the two-dimensional image information during a single exposure, a capture mode in which rows of the image are captured one by one, or a push-broom capture mode.

In general, the final image provided by a method of the invention is composed of intensity values which are respectively assigned to pixels of a matrix of this final image, this image matrix being constructed of adjacent columns and adjacent rows of pixels.

For a mode of capturing two-dimensional image information in a single exposure, the invention proposes an imaging method which comprises the following steps:

1. carrying an image-capturing instrument on board an aircraft or spacecraft, said instrument comprising an image-sensing optical system and at least one array of photodetectors which is arranged in a focal plane of the image-sensing optical system, this array of photodetectors consisting of adjacent columns and adjacent rows of photodetectors;
2. using the image-capturing instrument to capture radiation intensity values originating from unit regions of a scene; then
3. constructing the final image by assigning certain of the intensity values captured in step 2 to the pixels of the final image matrix.

The method of the invention is characterized by the following:

in step 2, the captured intensity values are restricted to a selection of one photodetector out of two along the columns and along the rows of the array of photodetectors, in a manner that constructs a selection of one photodetector out of four in this array of photodetectors; and in step 3, the pixels of the final image matrix to which are assigned the intensity values captured by the selected photodetectors are adjacent to each other in the rows and columns of the final image matrix.

Thus two photodetectors used to capture intensity values rendered in the final image are separated by at least one other intermediate photodetector in the array of photodetectors. In this manner, no crosstalk is produced between the photodetectors whose intensity values are used for the final image. The limitation of the modulation transfer function due to crosstalk between neighboring photodetectors is thus eliminated.

In addition, in a method of the invention, the resolution in the focal plane of the image-sensing optical system which results from the size of each photodetector is two times smaller than the resolution associated with each pixel in the final image. To maintain the same resolution in the final image, the array of photodetectors can be chosen with a photodetector pitch that is two times smaller than in a method that does not use the invention. The mean effect of the light intensity captured by each photodetector individually, resulting from its non-zero dimensions, is thus reduced. In mathematical terms, the collecting surface of each photodetector induces a convolution operation by a window function of smaller size. Thus the decrease in the individual size of the photodetectors also contributes to increasing the value of the modulation transfer function while the resolution of the final image remains the same. More specifically, the modulation transfer function is increased by a multiplicative factor of about 0.90/0.64, for the spatial frequency which corresponds to the resolution of the final image.

Lastly, the intensity values which are not used to construct the final image, meaning those captured by the photodetectors which are not selected according to the invention, may be left unread. The step of reading intensity values after each exposure of the array of photodetectors is therefore shorter, and images can be captured at a higher frequency. Step 2 of a method of the invention may therefore consist of first selecting the photodetectors for which the intensity values will be read, then only reading these intensity values from the selected photodetectors. Alternatively, the intensity values captured by all the photodetectors may first all be read, then only those captured by the photodetectors in the selection are used or stored. In other words, the selection of photodetectors according to the invention can occur before or after the captured intensity values are read.

For a row-by-row capture mode, the invention proposes an imaging method which comprises the following steps:

1. similarly carrying the image-capturing instrument on board the aircraft or spacecraft, with said instrument comprising the image-sensing optical system and at least one row of photodetectors which is arranged in the focal plane of this image-sensing optical system, the row of photodetectors consisting of adjacent photodetectors aligned in a longitudinal direction;
2. using the image-capturing instrument to capture radiation intensity values originating from unit regions of a scene, during successive exposures conducted such that a view of the scene is advanced in the focal plane perpendicularly to the longitudinal direction of the row of photodetectors; then
3. constructing the final image by assigning certain of the intensity values captured in step /2/to the pixels of the final image matrix.

Such a method of the invention is characterized by the following:

in step 2, the captured intensity values are restricted to a selection of one photodetector out of two along the longitudinal direction in the row of photodetectors, and the exposures are conducted such that the view of the scene is advanced in the focal plane, by twice the width of the photodetectors measured perpendicularly to the longitudinal direction, between two exposures; and in step 3, the pixels of the final image matrix to which are assigned the intensity values captured during successive exposures by the selected photodetectors are adjacent to each other in the columns and rows of the final image matrix.

The advantages of the invention which are listed above for a mode which captures the two-dimensional image information in a single exposure are identical for such a row-by-row capture mode.

In addition, these two modes of implementing the invention can be combined with a push-broom scanning mode.

In an embodiment of the invention for row-by-row capture mode, the image-capturing instrument may comprise at least one array of photodetectors having several rows of photodetectors which are adjacent and parallel to the longitudinal direction, in the focal plane of the image-sensing optical system. These rows of photodetectors may be part of at least one array able to capture the radiation intensity values in step 2 using a time delay integration (TDI) capture mode. In TDI mode, the image is captured line by line during successive sequences of exposing the array and simultaneously reading the captured intensity values, these sequences occurring each time the view of the scene is advanced in the focal plane by a distance equal to the individual width of the rows of photodetectors, measured perpendicularly to the longitudinal direction of the rows. In an implementation of the invention combined with TDI mode, the intensity values assigned to the pixels of the final image are limited to a selection of one photodetector out of two in each row of the array, and to a sequence of exposing the array and reading intensity values captured in TDI mode every two sequences.

The imaging methods of the invention are particularly well-suited for earth imaging applications. For such applications, the image-capturing instrument is on board an aircraft or satellite in orbit around the Earth, and the scene consists of a portion of the Earth's surface.

The improvements to the modulation transfer function which result from the invention, due to the impacts on photodetector crosstalk and photodetector size, can be used to reduce the dimensions of the image-sensing optical system. The image-capturing instrument can then offer reduced dimensions and weight while providing equal values for the final image resolution and modulation transfer function for the spatial frequency which corresponds to this resolution. This results in savings in the manufacture of this instrument, as well as in the costs of an aircraft or satellite carrying the instrument on board.

The invention additionally proposes imaging systems adapted to implement the methods described above, for a capture mode in which the two-dimensional image information is captured in a single exposure and for a row-by-row capture mode that is possibly TDI.

BRIEF DESCRIPTION OF THE DRAWINGS

Other features and advantages of the invention will be apparent from the following description of some non-limiting examples, with reference to the attached drawings, in which.

DETAILED DESCRIPTION OF THE DRAWINGS

FIGS. 1 to 5a and 5b are functional diagrams in which the dimensions of the elements represented do not correspond to the actual dimensions nor to the ratios between actual dimensions. In addition, the same references used in different figures denote the same elements or those with identical functions. Similarly, the numbers of columns and rows represented for the arrangement of photodetectors in the focal plane, as well as the numbers of columns and rows in the final image matrix, do not correspond to actual implementations of the invention but have been limited to simplify the figures.

Figure 1:
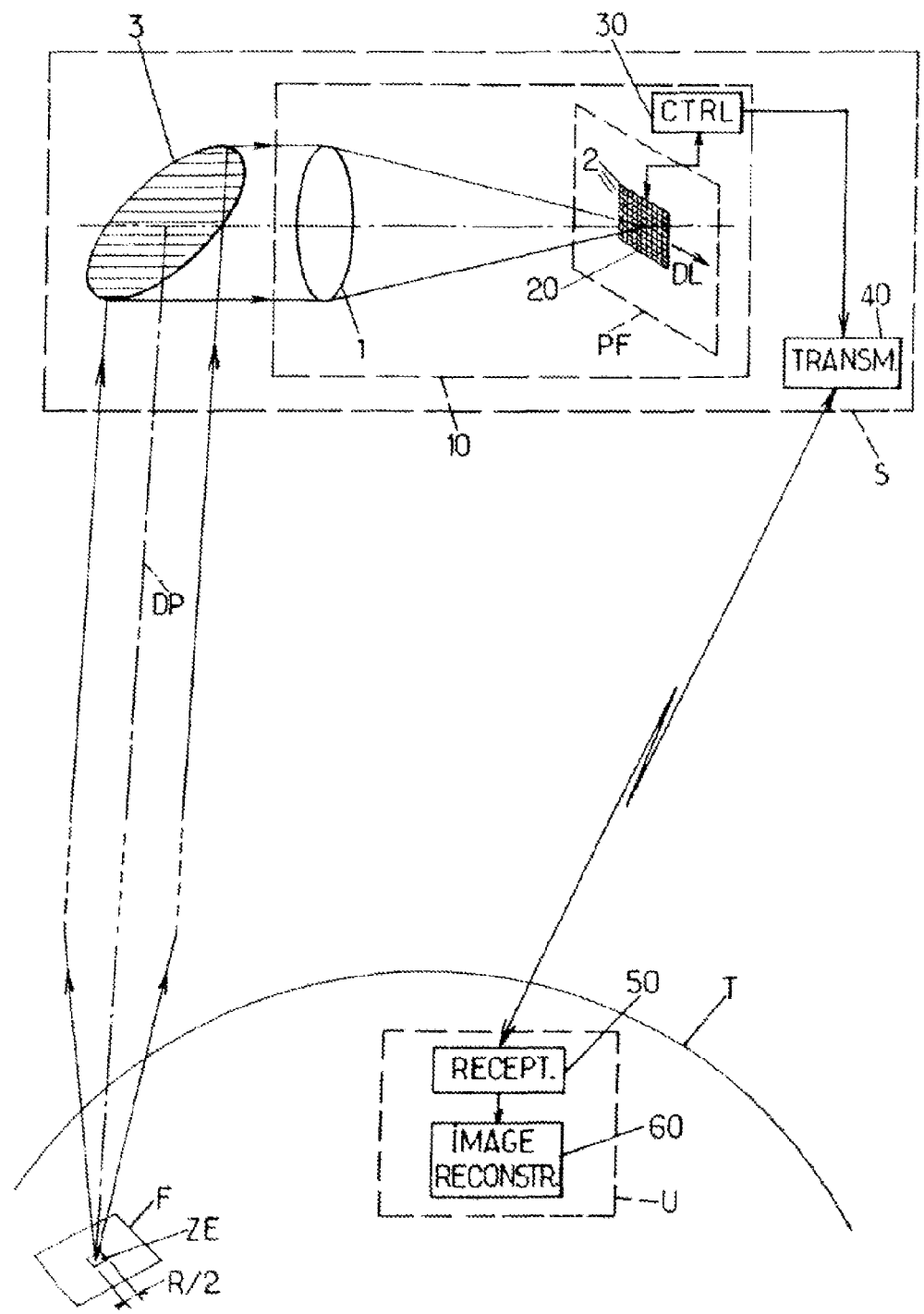
FIG. 1 is a perspective view of an imaging system adapted to implement a method of the invention with a capture mode in which the two-dimensional image information is captured in a single exposure.

FIG. 1 schematically illustrates a satellite S in orbit above the Earth, denoted T. The satellite S may be geostationary, but this is not necessary. An image-capturing instrument 10 is carried on board the satellite S, for capturing at least one image of a portion F of the surface of the Earth, which constitutes the photographed scene. The image data are transmitted by a transmitter 40, which is also carried on the satellite S, in the direction of a terrestrial station U of a user of the captured image. The user station U comprises a receiver 50 for the data sent by the transmitter 40. These image data may be transmitted between the transmitter 40 and the receiver 50 by any means, for example using radio waves or laser signals.

The image-capturing instrument 10 comprises, in a first embodiment of the invention:
- an image-sensing optical system 1, which is adapted to form an image of the portion of the Earth's surface F in a focal plane denoted PF;
- at least one array of photodetectors 20, which is arranged in the focal plane PF and in which each photodetector is individually referenced 2; and
- a control unit 30, which is adapted to control the capture of radiation intensity values for each of the photodetectors 2.

The image-sensing optical system 1 may be a telescope of a type known prior to the invention. It is represented symbolically as a convergent lens, although this is not to be considered as limiting its actual structure.

The array of photodetectors 20 consists of adjacent columns and adjacent rows of photodetectors 2, and each photodetector 2 is adapted to capture the intensity value of the radiation it receives from a unit region ZE of a portion of the Earth's surface F. This unit region ZE of the portion F is therefore optically paired by the optical system 1 with the corresponding photodetector 2. Possibly, a swiveling mirror 3 may be placed on the satellite S in front of the entrance to the image-sensing optical system, to orient the pointing direction DP of the optical system 1 towards that portion of the Earth's surface F. However, the swiveling mirror 3 is not indispensable to the invention, and the image-sensing optical system 1 may alternatively be aimed in the desired direction using a swiveling support for this optic system on the satellite S. This aiming may also be done by appropriately varying the attitude of the entire satellite S, in a manner known to a person skilled in the art. In this last case, the image-sensing optical system 1 can be supported on the satellite S with a fixed orientation relative to the satellite platform.

The control unit 30 specifically controls the operations of reset, accumulation, and reading for each photodetector 2, to obtain the intensity value for the radiation received by the photodetector at each exposure.

An image reconstruction unit 60 assigns, or attributes, the intensity values captured by the photodetectors 2 to the pixels of a matrix of a final image provided to the user. This assignment is done based on the coordinates of each photodetector 2 in the array 20, and the coordinates of each pixel in the final image matrix. Usually, the pixels to which the captured intensity values are assigned are adjacent to each other in the columns and rows of the final image matrix. The reconstruction unit 60 may be on board the satellite S, in which case the data of the final image are sent by the transmitter 40 to the receiver 50. Alternatively and as shown in FIG. 1, the reconstruction unit 60 may be located on Earth. In this case, the data sent between the satellite and the terrestrial station U may be the intensity values captured by the photodetectors 2.

In the invention, the control unit 30 is adapted to select one photodetector 2 out of two along the columns and along the rows of the array of photodetectors 20, in a manner that constructs a selection of one photodetector out of four in the array of photodetectors 20. After an exposure of the array 20 to the radiation from the portion of the Earth's surface F, the control unit 30 commands the reading of the intensity values captured by those of the photodetectors 2 which are selected.

The operation of the image reconstruction unit 60 is then restricted to the intensity values which were captured by the selected photodetectors, assigning these intensity values captured by only the selected photodetectors to pixels which are adjacent to each other in the final image matrix.

The image-capturing instrument 10 and the reconstruction unit 60 adapted for such an operation together form the imaging system of the invention.

Figure 2:
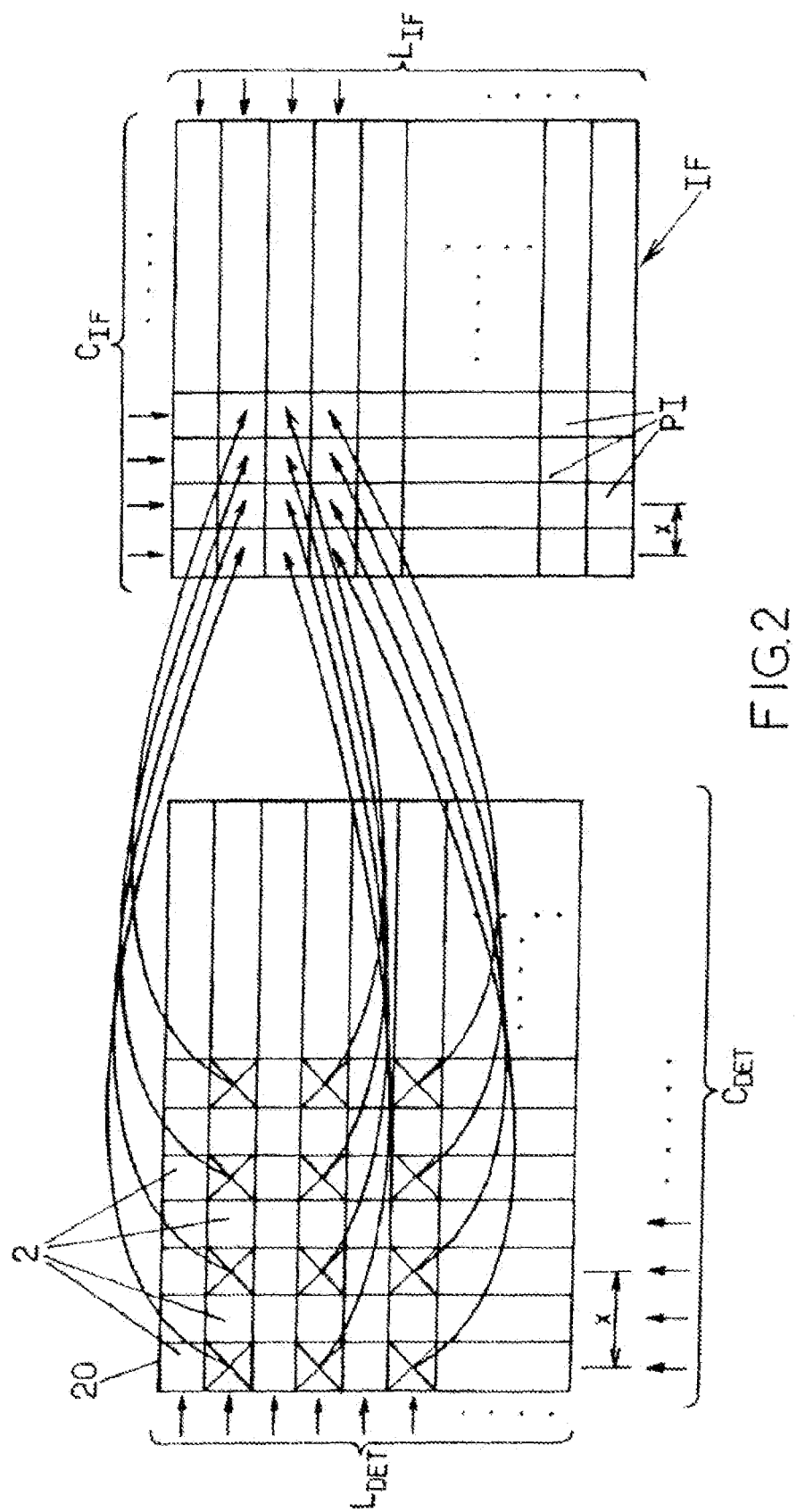
FIG. 2 is a schematic representation of a correspondence between photodetectors and pixels in the final image.

FIG. 2 illustrates the assignment of intensity values to the pixels of the final image, according to the invention.

The left part of FIG. 2 represents the array of photodetectors 20. $C_{DET}$ collectively designates the columns of this array of photodetectors 20, and $L_{DET}$ designates the rows. The Xs indicate photodetectors 2 of the array 20 which are selected according to the invention.

The right part of FIG. 2 represents the matrix of pixels in the final image provided to the user. This image matrix is designated overall by the reference IF, and PI denotes the individual pixels of the image matrix IF. $C_{IF}$ denotes the columns of pixels in the image matrix IF, and $L_{IF}$ denotes the rows of pixels of this same image matrix.

The arrows show the assignment to the pixels PI of the image matrix IF, of the intensity values captured by the selected photodetectors 2. Captured intensity values are thus assigned to all the pixels PI, said pixels being adjacent to each other in the columns $C_{IF}$ and rows $L_{IF}$. These assigned intensity values have been captured by the selected photodetectors, which are not adjacent to each other in the columns $C_{DET}$ and rows $L_{DET}$ but are separated by intermediate rows and columns of unselected photodetectors. However, the assignment of captured intensity values to pixels does not introduce any reversal in the order of the pixels relative to that of the photodetectors, in any direction in the focal plane PF.

The selection ratio for the photodetectors 2 is one out of two in each column $C_{DET}$ and in each row $L_{DET}$ in the array 20, so that a selection ratio of one out of four over the entire array 20 is obtained. As a result, the photodetector array 20 has two times as many columns and rows as the final image matrix IF. For this reason, the image which is formed in the focal plane PF is said to be oversampled relative to the final image IF. For example, to obtain a final image IF with 640 columns $C_{IF}$ of pixels and 480 rows $L_{IF}$ of pixels, the photodetector array 20 must contain 1280 columns $C_{DET}$ of photodetectors and 960 rows $L_{DET}$ of photodetectors.

In other words, the invention consists of bringing the rows and columns of the array 20 closer together by eliminating one out of two in both directions. The resolution R of the final image IF, meaning the distance on the ground in the portion of the Earth's surface F which corresponds to the passage from one column or row of pixels PI in the final image to the next column or row of pixels, is double the resolution of the view formed in the focal plane PF on the array of photodetectors 20. In FIG. 2, x denotes the distances which correspond to this resolution R, in the array of photodetectors 20 and in the final image IF. In FIG. 1, the size of the sides of the unit region ZE is therefore R/2.

Given that the intensity values which are used according to the invention to construct the final image IF originate from photodetectors 2 which are never adjacent to each other in the array 20, no crosstalk occurs that could affect these values.

In addition, the size of the photodetectors 2 of the array 20 used to implement the invention is half what would be used without the invention to obtain an identical resolution R of the final image IF with a one-to-one correspondence between the photodetectors of the array 20 and the pixels PI of the final image IF. This reduction by the invention of the photodetector size improves the modulation transfer function, in a manner that is in addition to the elimination of inter-photodetector crosstalk.

Preferably, the intensity values captured by those of the photodetectors 2 which are not selected are not sent by the transmitter 40. Advantageously, the control unit 30 can be programmed so that these intensity values of the unselected photodetectors are not read after each exposure of the array 20.

Figure 3:
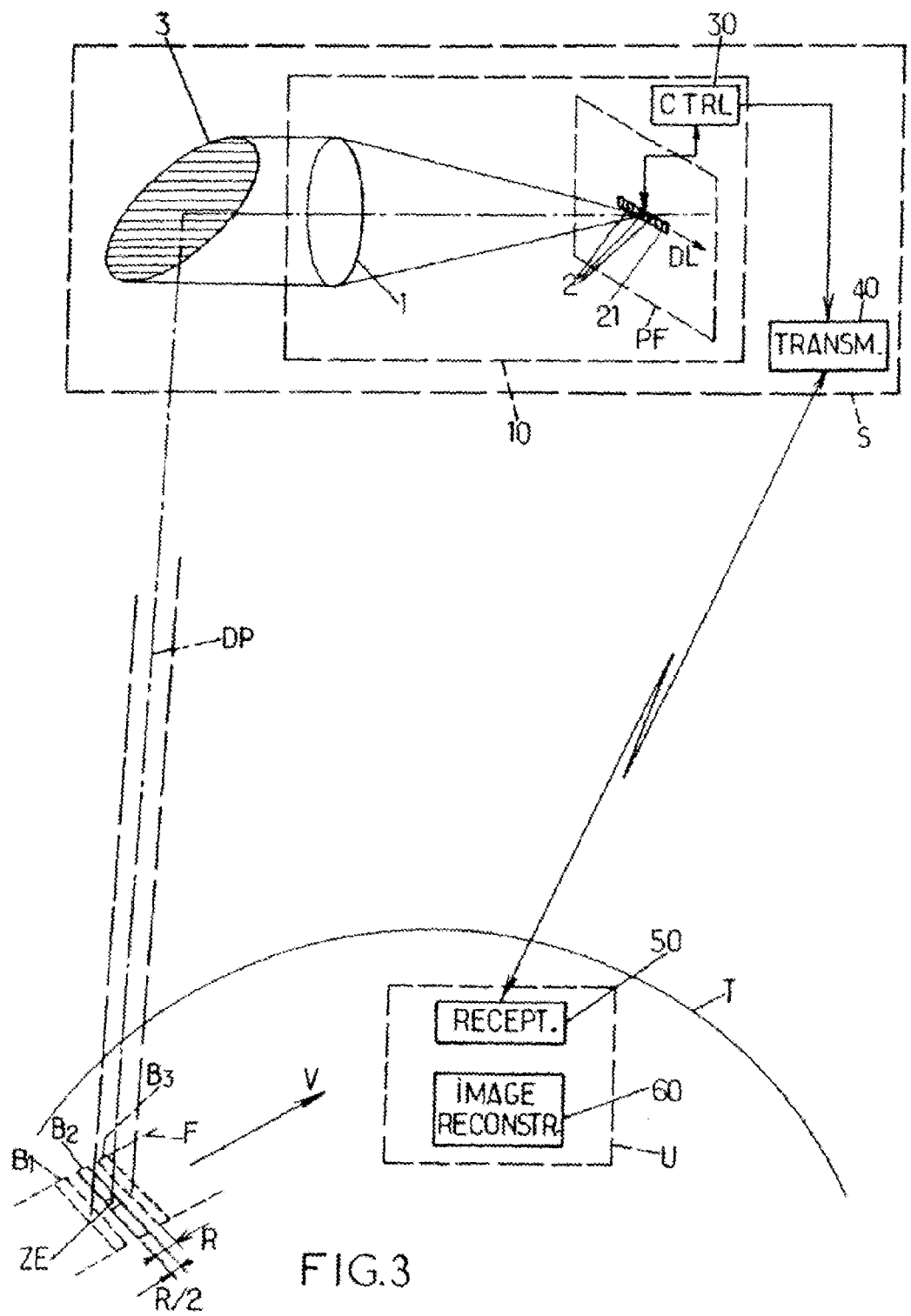
FIG. 3 illustrates a variant of the implementation of FIG. 1.

FIG. 3 illustrates a variant of the invention in which the array of photodetectors 20 is replaced by at least one, for example only one, row of adjacent photodetectors 2 aligned longitudinally in a direction denoted DL. Such a row of photodetectors can consist of an autonomous one-dimensional array 21 of photodetectors. In this figure, V denotes the path of the satellite S on the ground as it moves in its orbit. At each moment as the satellite S travels, the image-sensing optical system 1 forms, on the one-dimensional array 21, the image of a band across the portion of the Earth's surface F. The references $B_1$ to $B_3$ denote bands which correspond to three different times. They are spaced along the line V. In this case, the image of the portion of the Earth's surface F is captured row by row, combining the images of the bands of the portion F which are captured during successive exposures. For this variant of implementing the invention, one photodetector 2 out of two is selected by the control unit 30 for all exposures, along the direction DL, and the unit 30 additionally synchronizes the successive exposures of the one-dimensional array 21 with the travel of the satellite S along the path V. This synchronization consists of triggering each exposure so that the bands on the ground $B_1, B_2, B_3, \ldots$ are successively offset parallel to the line V by two times the individual width R/2 of these bands. Under these conditions, the image of the portion F in the focal plane PF is shifted between two successive exposures, perpendicularly to the direction DL, by two times the width of the photodetectors 2, the width of the photodetectors 2 to be considered also being measured perpendicularly to the direction DL. Thus the selection of one row out of two in the array of photodetectors 20 of the implementation in FIG. 1, is replaced by an appropriate frequency of exposures relative to the travel of the satellite S.

The image reconstruction unit 60 then assigns to the pixels PI of the final image matrix IF these intensity values which were captured during the successive exposures by the selected photodetectors 2. As above, the pixels PI to which are assigned the intensity values captured by the selected photodetectors of the one-dimensional array 21 are then adjacent to each other in the columns $C_{IF}$ and rows $L_{IF}$ of the final image matrix IF. However, two of the bands $B_1, B_2, B_3 \ldots$ of the portion F which are captured during different exposures are offset by a distance on the ground which is equal to 2n times the resolution R/2 of the final image IF, n being an integer, while each one-dimensional array has an individual width which is equal to R/2.

Figure 4:
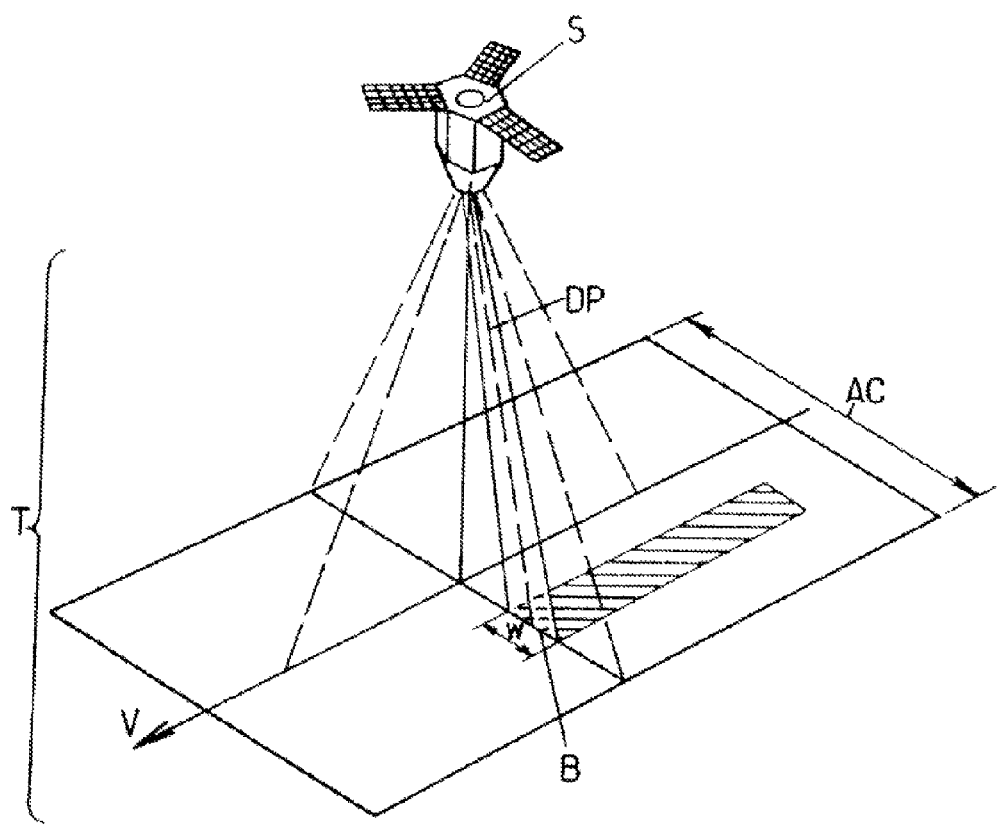
FIG. 4 illustrates an application of the invention to a push-broom capture mode.

The modes of implementing the invention described with reference to FIGS. 1 to 3 may be combined with a push-broom type of image capture mode. Such a capture mode is assumed to be known, and the principles are not detailed here. The main parameters of the push-broom mode are illustrated by FIG. 4:

V again denotes the path on the ground of the satellite S as it moves in orbit around the Earth T;

B is either the portion of the Earth's surface F of FIG. 1, or one of the bands $B_1, B_2, B_3, \ldots$ of FIG. 3;

w is the nominal swath width corresponding to each exposure and to the length of the two-dimensional array 20 or the one-dimensional array 21, in the longitudinal direction DL; and AC is the accessible ground swath for the images captured on the surface of the Earth T, which is obtained by varying the pointing direction DP perpendicularly to the path on the ground V.

The pointing direction DP may be varied between two successive exposures by modifying the orientation of the mirror 3, or by shifting the axis of rotation of the satellite S. Any other mode of varying the pointing direction DP may alternatively be used, however.

Figure 5A:
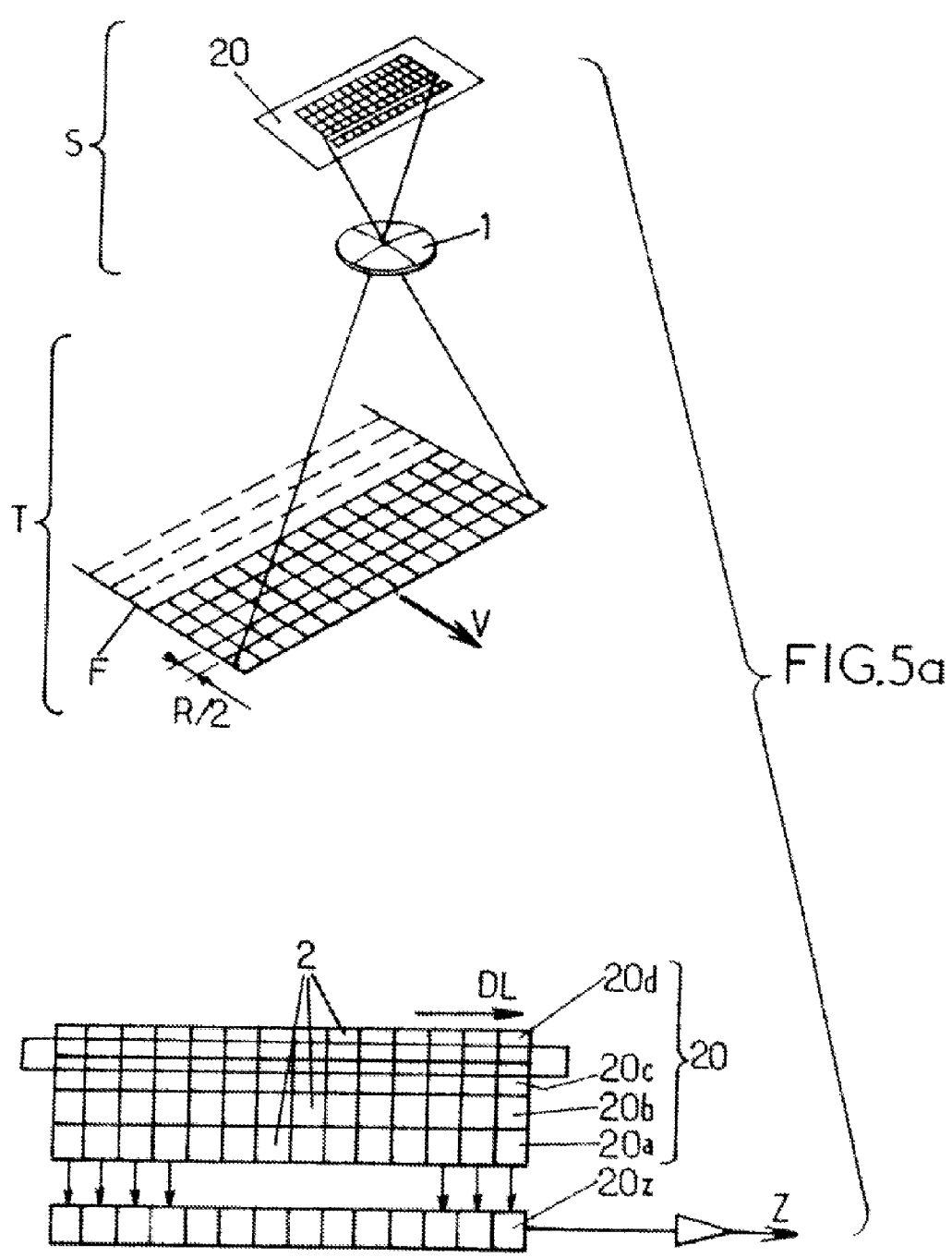
FIGS. 5a and 5b illustrate an implementation of the invention with a TDI capture mode.
Figure 5B:
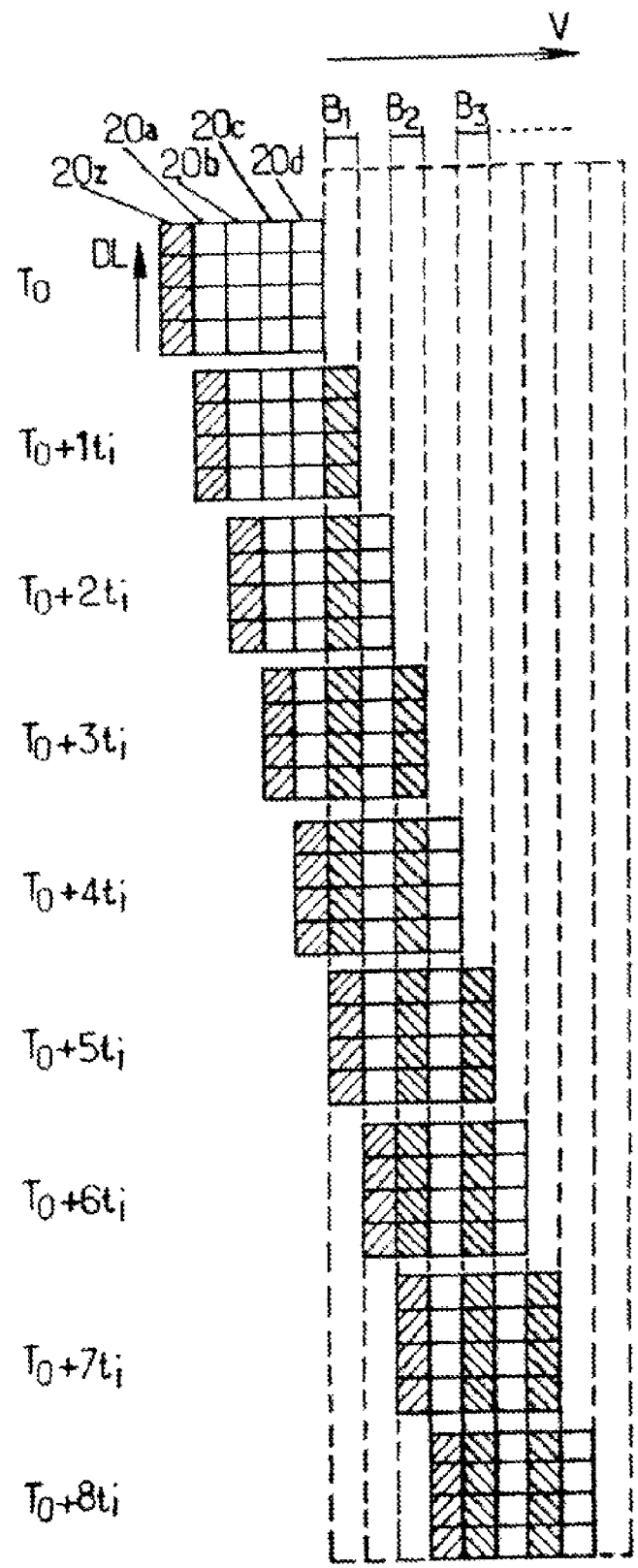

FIGS. 5a and 5b illustrate an adaptation of the invention to the specific capture type referred to as TDI. The lower portion of FIG. 5a is an enlarged schematic view of the TDI detector which is used. The elements which have already been described and are not modified are not repeated here. The array of photodetectors 20 is a TDI-CCD array, for example with four adjacent rows of photodetectors 2, labeled 20a to 20d, and a transfer register denoted 20z. Z indicates the read output from the array 20. For example, each row 20a-20d of the array 20 comprises 1280 photodetectors 2 which are adjacent in the longitudinal direction DL. The selection of photodetectors 2 in the rows 20a-20d, identical for all exposures, is the same as what was described with reference to the left portion of FIG. 2, but the intensity values captured by these selected photodetectors are read according to a TDI capture mode. Thus the intensity values assigned to the pixels PI of the final image matrix FI are sums of nominal intensity values captured during successive exposures by photodetectors shifted perpendicularly to the direction DL. FIG. 5b shows how each intensity value is captured perpendicularly to the direction DL, meaning in the direction of the columns of the array 20. The positions in the array 20 relative to the image of the portion of surface F in the focal plane PF are represented at successive times $T_0+jt_i$, $T_0$ being an initial time, $t_i$ being the TDI integration time and j being an integer successively equal to 1, 2, 3, .... The image of the band on the ground $B_1$ is formed in row 20d of photodetectors at time $T_0+t_i$, then in row 20c at time $T_0+2t_i$, then in row 20b at time $T_0+3t_i$, and lastly in row 20a at time $T_0+4t_i$. An exposure of the array 20 is triggered during each integration time, then the resulting signals are transferred to the transfer register 20z at time $T_0+5t_i$. Simultaneously, the band on the ground $B_2$ is captured by row 20d of photodetectors during the exposure which occurs at time $T_0+3t_i$, then by row 20c during the exposure at time $T_0+4t_i$, and then by row 20b at time $T_0+5t_i$, lastly by row 20a at time $T_0+6t_i$, and is transferred to the register 20z at time $T_0+7t_i$. Thus, between each exposure in TDI capture mode, the view of the scene F has been moved in the focal plane PF perpendicularly to the longitudinal direction DL by one time the individual width of the rows of photodetectors 20-20d, also measured perpendicularly to the direction DL. Only the intensity values which are thus transferred to the transfer register 20z at times $T_0+5t_i$, $T_0+7t_i$, etc., meaning at one integration time out of two, are then saved and assigned to the adjacent rows $L_{IF}$ in the final image IF. In addition, inside each of these rows $L_{IF}$, the intensity values which are assigned to the successive pixels PI result from a selection of one out of two of the values delivered by the transfer register 20z at each TDI read sequence.

In general, for all embodiments of the invention, the image-sensing optical system 1 can have a focal length which is greater than a focal length which would produce the same resolution R of the final image IF if this final image were composed of intensity values captured by adjacent photodetectors 2 in the focal plane PF with the photodetector size remaining constant. In other words, for the same resolution R of the final image IF and for the same value of the modulation transfer function corresponding to this resolution, the focal length of the image-sensing optical system 1 can be increased compared to a known imaging method from before the invention.

In addition, the entrance pupil of the image-sensing optical system can be sized for the resolution value which corresponds to two times the pitch between photodetectors in the array 20 or one-dimensional array 21, instead of the usually applied one time the value of this pitch between photodetectors.

Another advantage of the invention occurs when determining the dimensions of the image-sensing optical system 1. It is known that the components of this image-sensing optical system must have dimensions which are compatible with the resolution of the final image IF, and with the desired values for the modulation transfer function. In particular, a diameter is selected for each mirror of this optical system so that the entrance pupil leads to a diffraction which does not reduce the resolution of the final image IF nor the modulation transfer function. With the improvements to the contributions of photodetectors to the modulation transfer function, obtained by the invention, the dimensions of the image-sensing optical system 1 can be reduced, for example by a factor of 2. The price of the image-capturing instrument is reduced as a result, and its installation on board the aircraft or spacecraft is facilitated. In addition, the weight of the image-sensing optical system is also reduced, which, for an instrument which is carried on board a satellite, is an important advantage for the constraints related to launching the satellite.

In addition, the invention allows reducing the effect of aliasing. This effect results from the image sampling by the photodetectors, and occurs during the partitioning of this image into spatial frequencies. Generally, in the field of spatial imaging, meaning for the desired high resolution optical conditions, the diffraction which is produced by the image-sensing optical system causes a lowpass filtering of the spatial frequencies. This diffraction reduces the amplitudes of the spatial frequencies which are aliased, to a greater extent than the unaliased frequencies. By enabling a reduction of the entrance pupil size in the image-sensing optical system, the invention further decreases the amplitudes of the aliased spatial frequencies, such that the effect of aliasing is even less significant.

Figure 6:
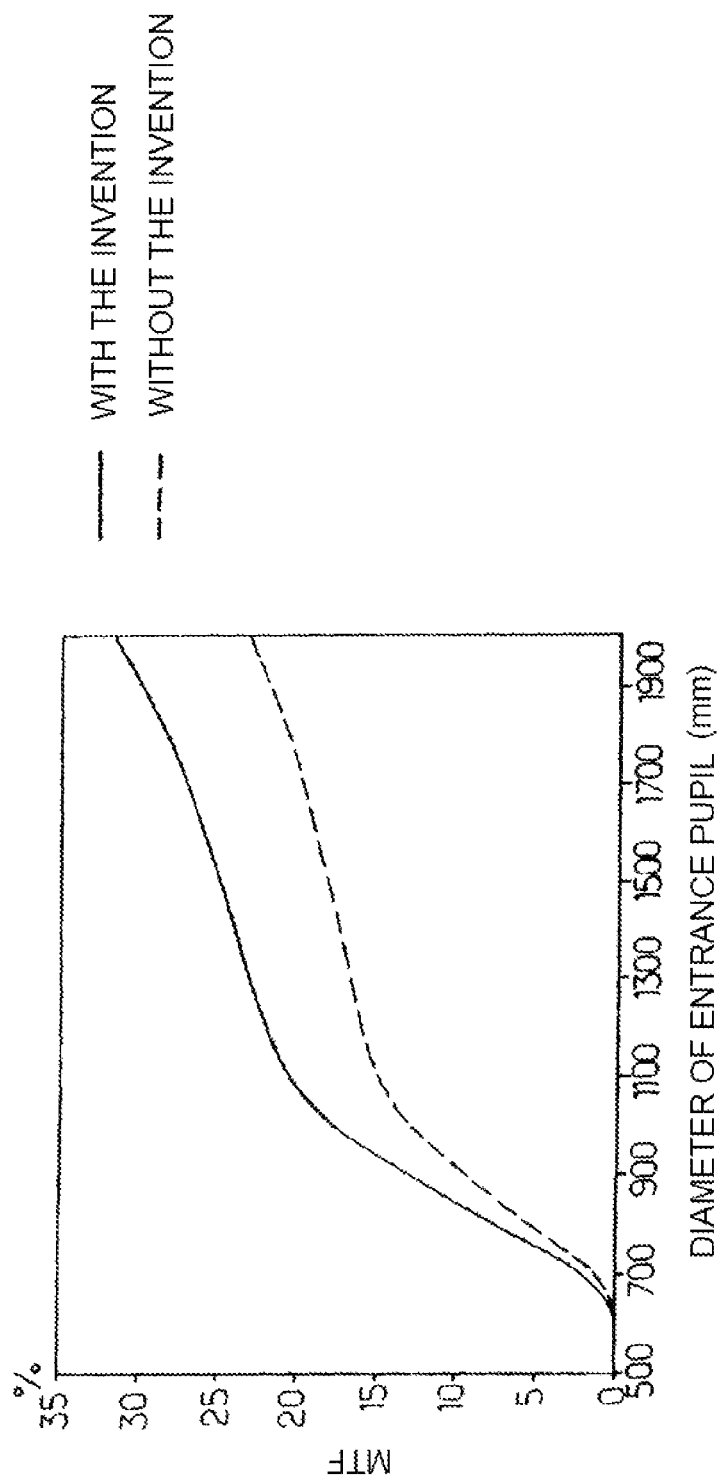
FIG. 6 is a diagram comparing dimensions of an image-sensing optical system with and without the invention.

FIG. 6 is a diagram which compares the values of the modulation transfer function, at identical resolutions of the final image, for a final image which is captured and reconstructed according to the invention (solid curve) and without the invention (dotted curve). Obtaining the final image without the invention corresponds to reading all adjacent photodetectors which are located in the focal plane of the image-sensing optical system and assigning, one by one, all the intensity values read to the pixels of the final image. The diameter of the entrance pupil of the image-sensing optical system is indicated on the x axis, and the values of the modulation transfer function are indicated on the y axis. This diagram shows in particular that for a value of 20% for the modulation transfer function, the diameter of the entrance pupil can be reduced from about 1700 mm to about 1050 mm.

Thus for identical values of the resolution and modulation transfer function, the invention allows reducing by a significant proportion the size of the entrance pupil of the image-sensing optical system while simultaneously increasing its focal length. This optical system therefore has an aperture which is greatly reduced, and the optical aberrations which are related to this aperture, such as spherical aberration, coma, and astigmatism, are reduced accordingly. In addition, this reduction of the aperture facilitates the creation of the dioptric and catadioptric surfaces in the image-capturing instrument, because of the decrease in the required radii of curvature.

It will be apparent to a person skilled in imaging that the various embodiments of the invention which have been detailed here are equivalent in practice to the principle of the invention illustrated by FIG. 2.

It is understood that the invention can be reproduced by adapting these modes in various ways, depending on the application of the imaging system. In particular, the invention can be implemented from any spacecraft, such as a satellite or space probe, or from any aircraft, such as an unmanned aircraft or survey aircraft.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. An imaging method for providing a final image composed of intensity values assigned respectively to pixels of a matrix of the final image consisting of adjacent columns and adjacent rows of pixels, the method comprising:
    carrying an image-capturing instrument on board an aircraft or spacecraft, said image-capturing instrument comprising an image-sensing optical system and at least one array of photodetectors which is arranged in a focal plane of the image-sensing optical system, said array of photodetectors consisting of adjacent columns and adjacent rows of photodetectors;
    using the image-capturing instrument to capture radiation intensity values originating from unit regions of a scene; then
    constructing the final image by assigning certain of the intensity values to the pixels of the final image matrix,
    wherein:
    the captured intensity values are restricted to a selection of one photodetector out of two along the columns and along the rows of the array of photodetectors, in a manner that constructs a selection of one photodetector out of four in said array of photodetectors; and
    the pixels of the final image matrix to which are assigned the intensity values captured by the selected photodetectors are adjacent to each other in the columns and rows of said final image matrix, and wherein the resolution in the focal plane of the image-sensing optical system which results from the size of each photo detector is two times smaller than the resolution associated with each pixel in the final image.

2. An imaging method for providing a final image composed of intensity values respectively assigned to the pixels of a final image matrix consisting of adjacent columns and adjacent rows of pixels, the method comprising:

carrying an image-capturing instrument on board an aircraft or spacecraft, said image-capturing instrument comprising an image-sensing optical system and at least one row of photodetectors which is arranged in a focal plane of the image-sensing optical system, said row of photodetectors consisting of adjacent photodetectors aligned in a longitudinal direction;

using the image-capturing instrument to capture radiation intensity values originating from unit regions of a scene, during successive exposures conducted such that a view of the scene is advanced in the focal plane perpendicularly to the longitudinal direction of the row of photodetectors; then constructing the final image by assigning certain of the intensity values captured to the pixels of the final image matrix, wherein:

the captured intensity values are restricted to a selection of one photodetector out of two along the longitudinal direction in the row of photodetectors, and the exposures are conducted such that the view of the scene is advanced in the focal plane, by twice the width of the photodetectors measured perpendicularly to said longitudinal direction, between two exposures; and the pixels of the final image matrix to which are assigned the intensity values captured during successive exposures by the selected photodetectors are adjacent to each other in the columns and the rows of said final image matrix, and wherein the resolution in the focal plane of the image-sensing optical system which results from the size of each photo detector is two times smaller than the resolution associated with each pixel in the final image.

3. The method according to claim 2, wherein the image-capturing instrument comprises several rows of photodetectors which are adjacent and parallel to the longitudinal direction in the focal plane, said rows forming at least one array, and wherein the radiation intensity values are captured in a time delay integration capture mode, the intensity values assigned to the pixels of the final image being limited to a selection of one photodetector out of two in each row of the array, and restricted to a sequence of exposing the array and reading the intensity values captured in time delay integration mode every two sequences, the sequences of exposing and reading in time delay integration mode occurring each time the view of the scene is advanced in said focal plane by a distance equal to the individual width of the rows of photodetectors, measured perpendicularly to said longitudinal direction.

4. The method according to claim 1, wherein a focal length of the image-sensing optical system is greater than a focal length producing an identical resolution of the final image if said final image were composed of intensity values captured by adjacent photodetectors in the focal plane, the dimensions of said photodetectors remaining constant.

5. The method according to claim 1, wherein the image-capturing instrument is carried on board an aircraft or a terrestrial satellite and wherein the scene is a portion of the Earth's surface.

6. An imaging system comprising an image-capturing instrument intended to be carried on board an aircraft or spacecraft, said image-capturing instrument comprising:

an image-sensing optical system adapted to form an image of a scene in a focal plane;

at least one array of photodetectors arranged in the focal plane, said array of photodetectors consisting of adjacent columns and adjacent rows of photodetectors, and each photodetector being adapted to capture a radiation intensity value originating from a unit region of the scene; and a control unit, adapted to select one photodetector out of two along the columns and along the rows of the array of photodetectors, in a manner that constructs a selection of one photodetector out of four in said array of photodetectors, and adapted to command the reading of the intensity values captured by the selected photodetectors after a same exposure, the imaging system additionally comprising an image reconstruction unit adapted to assign the intensity values captured by the selected photodetectors to pixels of an image matrix, said pixels to which are assigned the intensity values captured by the selected photodetectors being adjacent to each other in the columns and rows of the final image matrix, and wherein the resolution in the focal plane of the image-sensing optical system which results from the size of each photo detector is two times smaller than the resolution associated with each pixel in the final image.

7. An imaging system comprising an image-capturing instrument intended to be carried on board an aircraft or spacecraft, said image-capturing instrument comprising:

an image-sensing optical system adapted to form an image of a scene in a focal plane;

at least one row of photodetectors arranged in the focal plane, said row of photodetectors consisting of adjacent photodetectors aligned in a longitudinal direction, and each photodetector being adapted to capture a radiation intensity value originating from a unit region of the scene; and a control unit adapted to select one photodetector out of two along the longitudinal direction of the row of photodetectors, and adapted to command the reading of the intensity values captured during a same exposure by the selected photodetectors, then during successive exposures conducted when the view of the scene is advanced in the focal plane perpendicularly to the longitudinal direction of the row of photodetectors, by twice the width of said photodetectors measured perpendicularly to said longitudinal direction, between two of the exposures, said imaging system additionally comprising an image reconstruction unit adapted to assign to the pixels of an image matrix said intensity values captured during successive exposures by the selected photodetectors, said pixels to which are assigned said intensity values captured by the selected photodetectors being adjacent to each other in the columns and rows of the final image matrix, and wherein the resolution in the focal plane of the image-sensing optical system which results from the size of each photo detector is two times smaller than the resolution associated with each pixel in the final image.

8. The system according to claim 7, wherein the image-capturing instrument comprises several rows of photodetectors which are adjacent and parallel to the longitudinal direction in the focal plane, said rows being part of an array able to capture radiation intensity values according to a time delay integration capture mode, the control unit being adapted to select one photodetector out of two in each row of the array, and to select those of said intensity values captured in time delay integration mode during a sequence of exposing the array and reading said captured intensity values, doing so every two exposure and reading sequences, said exposure and reading sequences being commanded each time the view of the scene is advanced in said focal plane by a distance equal to the individual width of the rows of photodetectors, measured perpendicularly to said longitudinal direction.

9. The system according to claim 7, wherein a focal length of the image-sensing optical system is greater than a focal length producing the same resolution of the final image if said final image were composed of intensity values captured by adjacent photodetectors in the focal plane with the size of said photodetectors remaining constant.

10. The imaging method according to claim 1, wherein intensity values which have been captured by those of the photodetectors which are not selected are left unread.

11. The imaging method according to claim 2, wherein intensity values which have been captured by those of the photodetectors which are not selected are left unread.

12. The system according to claim 6, wherein intensity values which have been captured by those of the photodetectors which are not selected are left unread.

13. The system according to claim 7, wherein intensity values which have been captured by those of the photodetectors which are not selected are left unread.

\* \* \* \* \*